United States Patent [19]

Stewart et al.

[11] Patent Number: 4,755,936
[45] Date of Patent: Jul. 5, 1988

[54] APPARATUS AND METHOD FOR PROVIDING A CACHE MEMORY UNIT WITH A WRITE OPERATION UTILIZING TWO SYSTEM CLOCK CYCLES

[75] Inventors: Robert E. Stewart, Stow; Barry J. Flahive, Westford; James B. Keller, Arlington, all of Mass.

[73] Assignee: Digital Equipment Corporation, Maynard, Mass.

[21] Appl. No.: 823,805

[22] Filed: Jan. 29, 1986

[51] Int. Cl.[4] .............................................. G06F 13/00
[52] U.S. Cl. ..................................................... 364/200
[58] Field of Search .......................... 364/200 MS File

[56] References Cited

U.S. PATENT DOCUMENTS

| | | | |
|---|---|---|---|
| 3,723,976 | 3/1973 | Alvarez et al. | 364/200 |
| 3,896,419 | 7/1975 | Lange et al. | 364/200 |
| 3,979,726 | 9/1976 | Lange et al. | 364/200 |
| 4,245,304 | 1/1981 | Porter et al. | 364/200 |
| 4,264,953 | 4/1981 | Douglas et al. | 364/200 |
| 4,332,010 | 5/1982 | Messina et al. | 364/200 |
| 4,345,309 | 8/1982 | Arulpragasam et al. | 364/200 |
| 4,439,829 | 3/1984 | Tsiang | 364/200 |
| 4,486,856 | 12/1984 | Heckel et al. | 364/900 |
| 4,573,116 | 2/1986 | Ong et al. | 364/200 |
| 4,612,612 | 9/1986 | Woffinden et al. | 364/200 |
| 4,669,043 | 5/1987 | Kaplinsky | 364/200 |
| 4,682,281 | 7/1987 | Woffinden et al. | 364/200 |

OTHER PUBLICATIONS

Blount et al., IBM Tech. Disclosure Bulletin, vol. 23, No. 1, Jun. 1980, pp. 262–263.
Alsing et al., EP A2 0039227 Apr. 27, 1987.

Primary Examiner—Gareth D. Shaw
Assistant Examiner—Debra A. Chun
Attorney, Agent, or Firm—William W. Holloway; Maura K. Moran

[57] ABSTRACT

A cache memory unit is disclosed in which, in response to the application of a write command, the write operation is performed in two system clock cycles. During the first clock cycle, the data signal group is stored in a temporary storage unit while a determination is made if the address signal group associated with the data signal group is present in the cache memory unit. When the address signal group is present, the data signal group is stored in the cache memory unit during the next application of a write command to the cache memory unit. If a read command is applied to the cache memory unit involving the data signal group stored in the temporary storage unit, then this data signal group is transferred to the central processing unit in response to the read command. Instead of performing the storage into the cache memory unit as a result of the next write command, the storage of the data signal in the cache memory unit can occur during any free cycle.

8 Claims, 4 Drawing Sheets

APPARATUS AND METHOD FOR PROVIDING A CACHE MEMORY UNIT WITH A WRITE OPERATION UTILIZING TWO SYSTEM CLOCK CYCLES

BACKGROUND OF THE INVENTION

1. Field of the Invention

This invention relates generally to data processing systems and, more particularly, to data processing systems in which the central processing unit includes a cache memory unit. The present invention permits a write operation into the cache memory unit within the limits of a shortened system clock cycle.

2. Description of the Related Art

Referring to FIG. 1, a typical data processing system configuration is shown. The data processing system includes at least one central processing unit 10 (and 11), at least one input/output unit 13 (and 14), a main memory unit 15 and a system bus 19 coupling the plurality of units of the data processing system. The central processing unit processes groups of logic signals according to software and/or firmware instructions. The logic signal groups to be processed are typically stored in the main memory unit 15. A console unit 12, which can be coupled to the central processing unit(s) 10 (and 11), can include the apparatus and stored instructions to initialize the data processing system and can act as a terminal during the operation of the data processing system. The input/output unit(s) 10 (and 11) can provide an interface for the exchange of logic signal groups between the data processing system and terminal units, mass storage units, communication units, and any other units to be coupled to the data processing system.

Although the system shown in FIG. 1 can execute the procedures determined by the system programs, this system suffers from the separation of the main memory unit 15 and the central processing unit(s) 10 (and 11). This separation causes the logic signal groups required by the central processing unit(s) 10 (and 11) to be delayed in the transfer, thereby resulting in a negative impact on the system performance. In addition, the size of the main memory unit 15 required by programs typically used by the data processing system generally causes the main memory unit 15 to be implemented in a slower technology (i.e. for reasons of cost) and the consequential detrimental impact on performance can result even when the main memory unit 15 is closely associated with the central processing unit.

The solution typically used to resolve the conflict resulting from the need for a large memory unit and the need for rapid access to logic signal groups at reasonable cost is the use of the cache or buffer memory unit associated with each central processing unit. Referring to FIG. 2, the central processing unit 10 includes a cache memory unit 24 associated with the processing components of the central processing unit 10. The processing components include an instruction subunit 21 and an execution subunit 23. Also included in FIG. 2 is a control unit 22. The control unit 22 can be employed advantageously when the execution of an instruction by the central processing unit 10 is divided into a plurality of instruction segments permitting overlapping execution of instructions in a technique typically referred to as "pipelining" the execution of the instruction sequence. The advantage of this technique is that, even though a segmented instruction can take a longer time for its execution, consecutive instructions can be initiated after a period of time equal to the time assigned for execution of each instruction segment. Therefore the processing speed of the central processing unit 10 can be increased by assuming the penalty of increased complexity in the central processing unit 10. However, the time interval required for execution of each instruction segment must be chosen to accommodate the instruction segment requiring the longest time for execution. Because the cache memory unit 24 is a part of the central processing unit 10, the operation of this unit must be completed within the allotted time or else the time interval must be lengthened. The cache memory unit 24 serves as an intermediate storage facility (between the main memory unit 15 and the execution portions of the central processing unit 10). The cache memory unit 24 stores the logic signal groups of most immediate importance to the execution portions of the central processing unit 10 to avoid the delays incurred in retrieving these logic signal groups from the main memory unit 15.

Referring next to FIG. 3a, a typical implementation of a cache memory unit 24 according to the related art is shown. Groups of logic signals representing data to be manipulated by the central processing unit 10 are applied to data-in storage unit 31. Mask signals can also be applied to data-in storage unit 31, the mask signals identifying a selected portion of an associated data logic signal group. Groups of logic signals representing addresses of associated data signal groups are applied to address-in storage unit 32. Storage units 31 and 32 can be implemented by latch-type circuits, flip-flop type circuits, register circuits, portions of another circuit or any circuit that can provide a buffering signal storage function for the remainder of the cache memory unit 24. A first portion of the output signals from the address-in storage unit 32 are applied to the address-in terminals of the tag storage unit 33 and to the address-in terminals of the data storage unit 34. The second group of output signals from the address-in storage unit 32 are applied to the data-in terminals of the tag storage unit 33. The output signals from data-in storage unit 31 are applied to the data-in terminals of the data storage unit 34. The tag storage unit 33 and the data storage unit 34 are comprised of groups of storage cells, the number and electrical coupling of the storage cell groups permitting the first signal group of address signals from address-in storage unit 32 to address the designated storage cell group in unit 33 and 34. The number of storage cells in each group in the tag storage unit 33 must be sufficient to accommodate the second portion of the address signal group (less any address signals accommodated by storing a plurality of data signal groups at a given address) plus any status logic signals that can be associated with each data signal group to be stored. The number of storage cells in each group in the data storage unit 34 must be sufficient to store the number of logic signals associated with each address. The output terminals of the data storage unit 34 are coupled to the data-out storage unit 36. The output terminals of the tag storage unit 33 and the output signals from the second group of address signals in the address-in storage unit 32 are coupled to comparator unit 35. Referring now to FIG. 3b, the division of an address signal groups is illustrated. The first portion of the address signal group is the index address field and addresses associated storage cell groups in both the tag storage unit 33 and the data storage unit 34. The second portion, referred to as the tag or comparison address field in FIG. 3b, of the address signal group is typically the remainder of the address associated with a data signal group and is stored in the tag storage unit 33 at the same index address as the data signal group associated with the complete address. The dashed line cells at the end of the address signal group in FIG. 3b illustrate that when a storage cell group in the data storage unit 33 stores a plurality of the smallest addressable signal groups, then the retention of the least significant address bits is redundant. It will also be clear to those familiar with the functioning of cache memory units that the index field in the address signal group need not be the least significant address bits in the address signal group as shown in FIG. 3b, but can be selected to implement any of a number of data signal group storage strategies.

A "read" operation, retrieving information from the cache memory unit 24, can be understood as follows. The address signal group, associated with the data signal group selected for retrieval, is entered in the address-in storage unit 32. The index address field of the address signal group is applied to the address-in terminals of the tag storage 33 and to the address-in terminals of the data storage unit 34. Because the "read" signal is applied to the storage unit 34, the group of signals stored in the location addressed by the index address field, i.e. the comparison address field, is entered in the comparator unit 35, while the group of signals stored at the index address of the data storage unit 34, i.e. the data signal group associated with the index plus comparison address fields, is entered in data-out storage unit 36. Simultaneously, the tag or comparison address field of the address signal group stored in the address-in storage unit 32 is entered in the comparator unit 35 and compared with the comparison address field retrieved from the tag storage unit 33. When the comparison is positive, then the data signal group in the data-out storage unit 36 is the selected signal group. This result is communicated to the data-out storage unit 36 by means of a signal generally referred to as a "hit" signal. In order to minimize the effect of the extra time required to perform the comparison, the data signal group can be transferred to other apparatus and the "hit" signal (or the absence of a "hit" signal) can be used to control the transfer of the selected data signal group at a different location of the central processing unit 10. When the comparison is negative, i.e. the selected data signal group is not in the data storage unit 34 (and thus consequently not in data-out storage unit 36), then the selected data signal group must be retrieved from the main memory unit 15.

A "write" operation, in which a data signal group is stored in the cache memory unit 24, is implemented as follows. An address signal group is entered in address-in storage unit 32, while an associated data signal group is entered in the data-in storage unit 31. The index portion of the address signal group is applied to the address terminals of the tag storage unit 33 and the comparison portion of the address signal group is entered in comparison portion of the address signal group is entered in comparison unit 35. The tag address portion stored in the storage cell group of tag storage unit 33, identified by the index portion, is compared in comparison unit 35 with the comparison portion of the address signal group that was entered in the comparison unit 35. If the result of this comparison is that the tag address groups are the same, then the "hit" signal activates the write terminal to which a "write" signal has been applied of the data storage unit 34 and the data signal group stored in the data-in storage unit 31 is entered in the data storage unit 34 at the location defined by the index signal group stored in the address-in storage unit 32. If a "hit" signal is not generated, then the data signal group is stored in the main memory unit 15 (see FIG. 1) at the address specified by the associated address signal group in the main memory. It will be clear that the write operation takes a substantially longer time to perform than the read operation because the storage of the data signal group can take place only after the comparison of the tag signal groups has been completed. An attempt to increase the speed of the operation of the cache memory unit 24 in a central processing unit 10 having a control unit 22, such as is shown in FIG. 2, is limited by the sequential nature of the write operation.

A need has therefore been felt for apparatus and method for a cache memory unit capable of operation consistent with the system clock cycles of a central processing unit having a segmented or pipelined execution of an instruction sequence.

SUMMARY OF THE INVENTION

It is an object of the present invention to provide an improved data processing unit.

It is another object of the present invention to provide an improved cache memory unit in a central processing subsystem.

It is another object of the present invention to provide a cache memory unit operating in a manner consistent with a central processing unit having segmented or pipelined instruction execution.

It is a more particular object of the present invention to provide a cache memory write operation that can be performed in two system clock cycles.

It is yet another particular object of the present invention to provide a cache memory unit in which the storage of data signal groups is accomplished in two stages, the first stage being the temporary storage of the data signal group while the presence in the cache memory unit of an address signal group associated with the data signal group is determined, the second stage being the storage of the data signal group when the associated address signal group is present in the cache memory unit.

The aforementioned and other objects are accomplished, according to the present invention, by providing the cache memory unit in a central processing unit in which the write operation is performed during two system clock cycles. The read operation can be performed in one cycle. During the first clock cycle of a write operation, the comparison between the address associated with the write operation and the tag or comparison address field stored in the tag storage unit at the index address is made. During this first cycle, the data signal group and the index portion of the address signal group are stored in an auxiliary register. In the event of a positive comparison, during the next cycle in which a write command is present, the data signal group in the auxiliary storage unit is stored in the data storage unit, thereby completing the write operation. In order to insure that the latest version of a data signal group is used by the central processing unit during a read command, the address of the data signal group in the auxiliary storage unit is checked along with the comparison address field in the tag storage unit. When the requested data signal group is in the auxiliary storage unit, this data signal group is transferred to the central processing unit.

These and other features of the present invention will be understood upon reading of the following description along with the drawings.

DETAILED DESCRIPTION OF THE DRAWINGS

1. Detailed Description of the Figures

FIG. 1, FIG. 2, and FIG. 3a and 3b have been previously described in relation to the related art.

Figure 1:
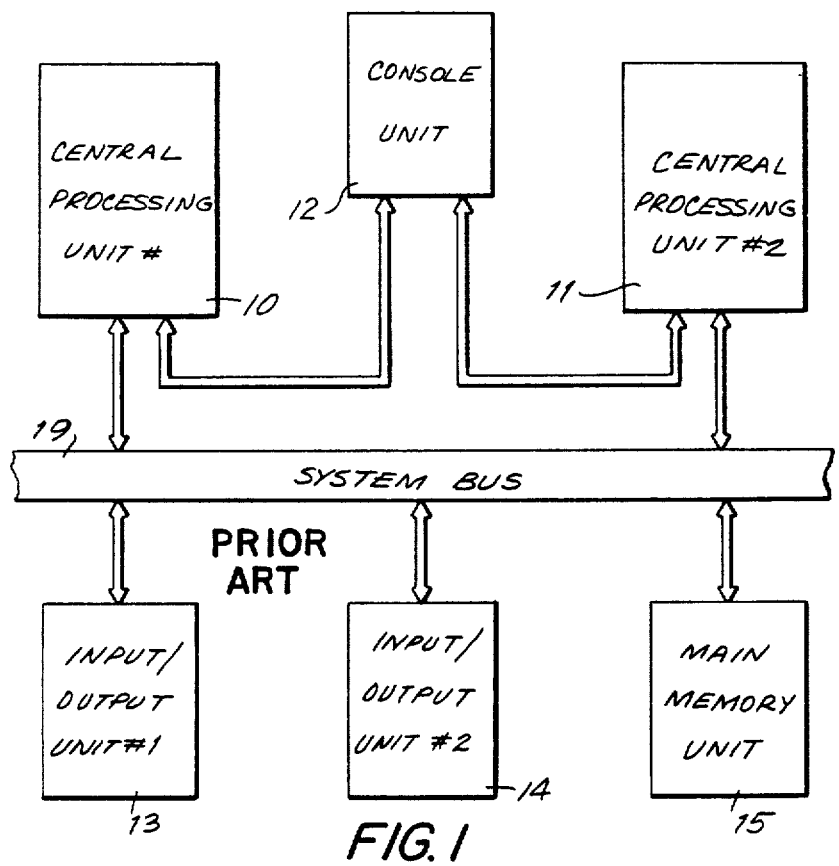
FIG. 1 is a block diagram of the components of a data processing system capable of utilizing the present invention.
Figure 2:
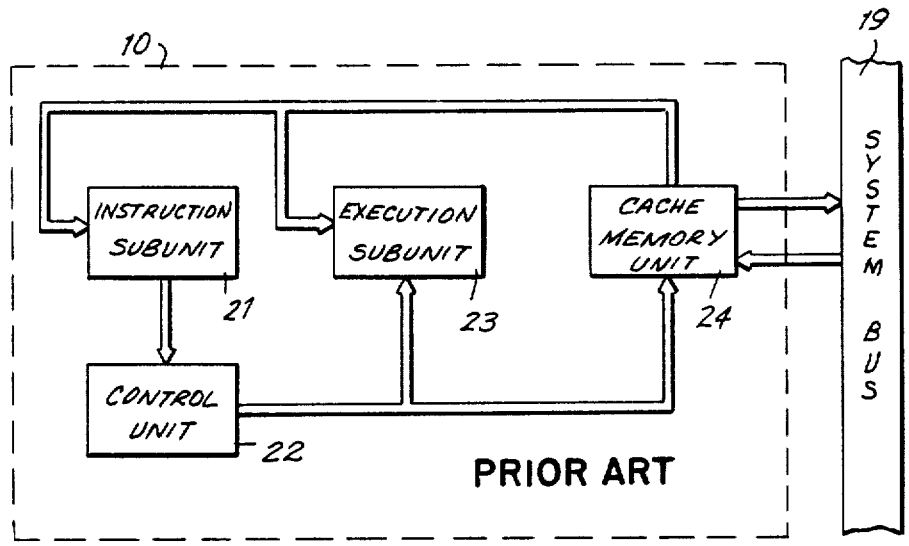
FIG. 2 is a block diagram of the components of one of the central processing units shown in FIG. 1.
Figure 3A:
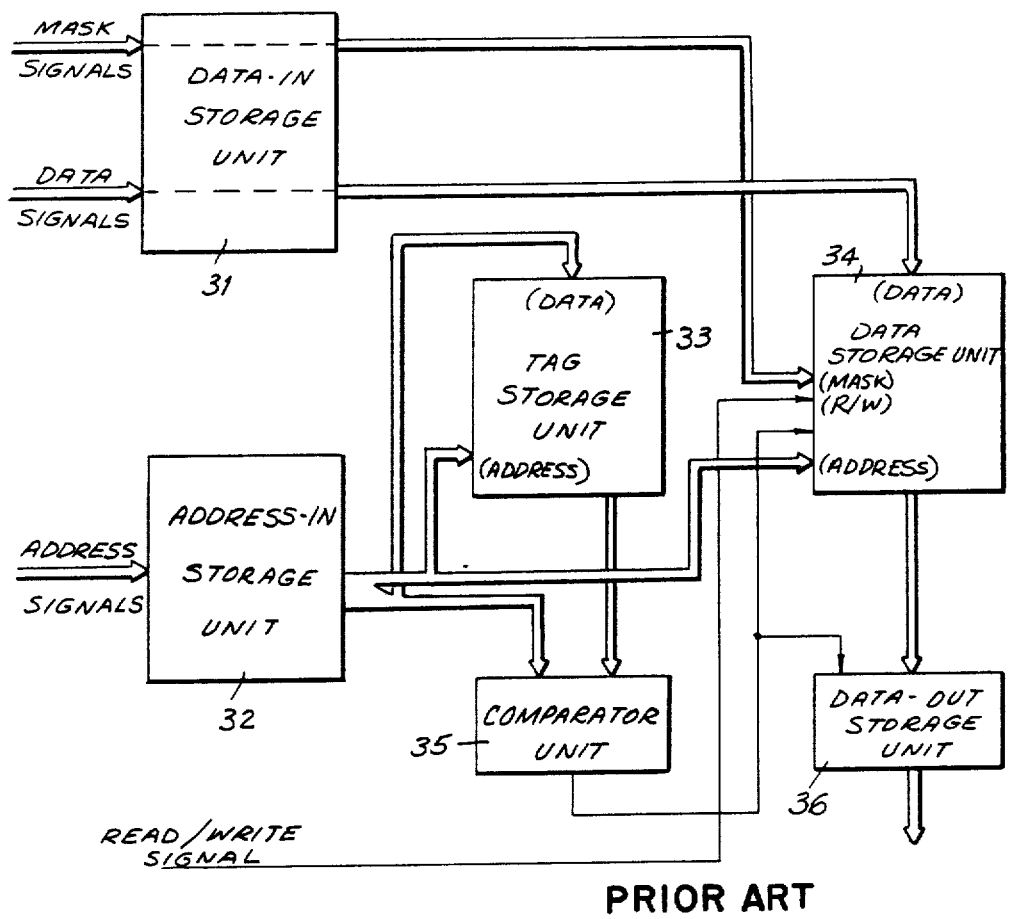
FIG. 3a is a block diagram of a cache memory unit used in a central processing unit.
Figure 3B:
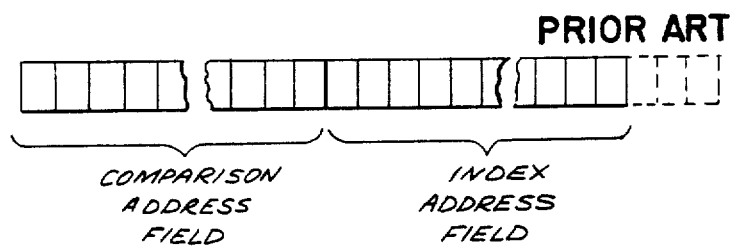
FIG. 3b is a diagram illustrating the division of an address signal group into defined fields.
Figure 4:
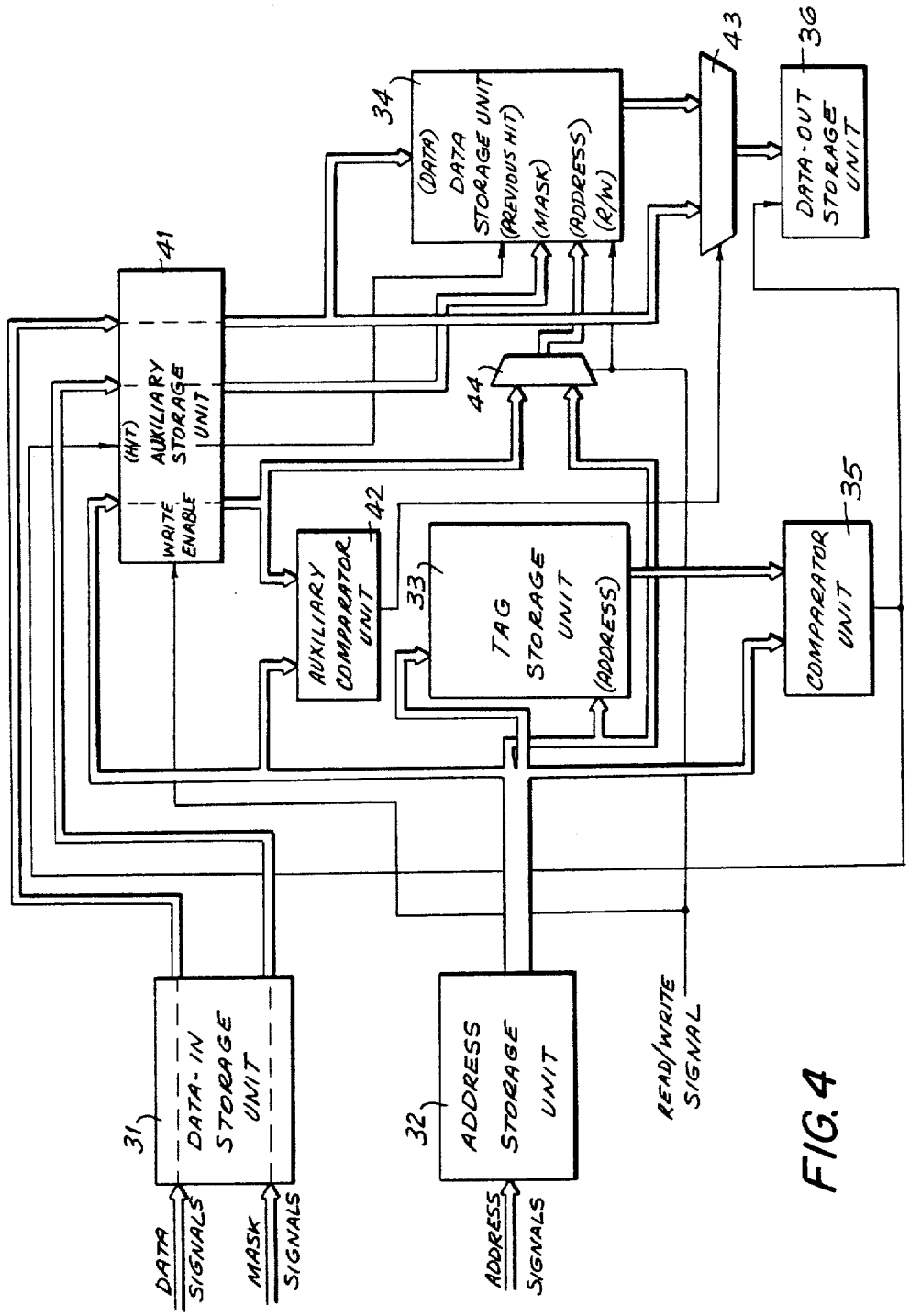
FIG. 4 is a block diagram of the cache memory unit according to the present invention.

Referring next to FIG. 4, the implementation of the cache memory unit according to the present invention is shown. The cache memory unit is illustrated in a manner similar to the cache memory unit 24 of FIG. 3a. Additional apparatus includes an auxiliary storage unit 41 that can store data signal groups from the data-in storage unit 31, mask signals, and index field portions of the address signal group stored in address-in storage unit 32. An auxiliary comparator unit 42 can compare address signal index portions from the auxiliary storage unit 41 and from the address-in storage unit 32. The logic signal group applied to the address terminals of data storage unit 34 is determined by controllable gate or multiplexer unit 44 and is either the signal group in the address-in storage unit 32 or in the auxiliary storage unit 41 depending on whether the command signal is a read or a write signal respectively. The data signal group selected by multiplexer 43 to be entered in data-out storage unit 36 is determined by a positive comparison signal generated by the auxiliary comparator unit 42. If the comparison is positive, the data signal group from auxiliary storage unit 41 is selected; otherwise, the data signal group from storage unit 34 is selected. Transfer of the data logic signals entered into data-out storage unit 36 to the central processing unit is dependent upon the application of the "hit" signal from comparator unit 35 in the same manner as described previously with reference to FIG. 3a.

Figure 5:
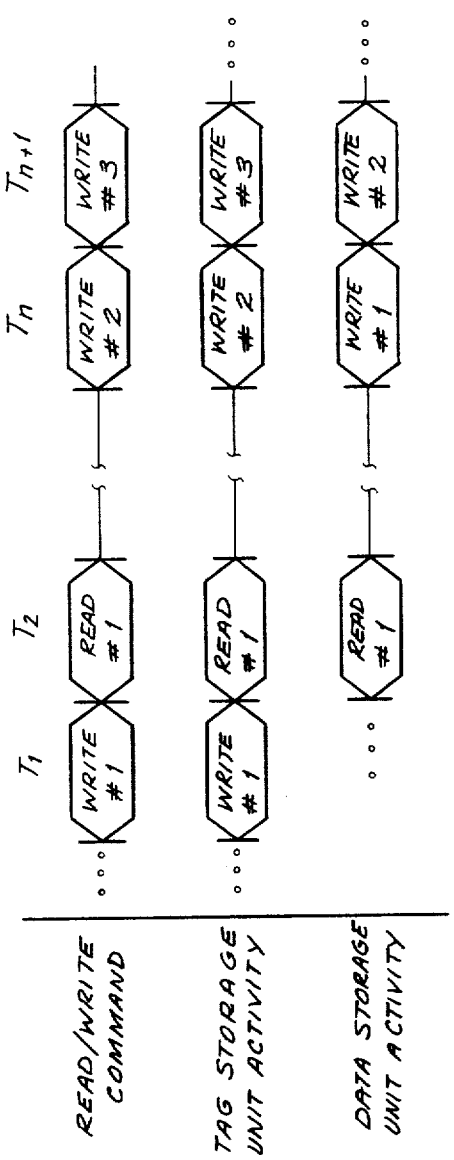
FIG. 5 is a timing diagram illustrating the manner in which the two-cycle write operation permits an intervening read operation.

Referring next to FIG. 5, the execution of three write operations and a read operation intervening between the first two write commands is shown. During clock cycle $T_1$, a write command is issued to the cache memory unit 24 and the tag storage unit 33 executes the comparison activity. During cycle $T_2$, a read operation can be completely executed by the cache memory unit 24. During a later cycle $T_n$, the next sequential (a second) write command is issued to the cache memory unit 24 and the associated tag storage unit 33 activity is performed. If the result of the tag storage unit 33 activity during cycle $T_1$ indicated a positive comparison, then simultaneously, during cycle $T_n$, the data signal group, associated with the write command issued in $T_1$ is stored in the data storage unit 34. Then, during cycle $T_{n+1}$ (when the third write command is issued), if the comparison performed during $T_n$ is positive, the data signal group associated with the write command issued in $T_n$ is stored in the data storage unit 34.

2. Operation of the Preferred Embodiment

The operation of the cache memory unit 24 for a write operation is performed in two steps according to the present invention. In the first step, the address signal group identifying the data signal group is compared in comparator unit 35 with the address signal groups in the tag memory storage unit 33 to determine if the data signal group associated with the address signal group is contained in the cache memory unit 24. During the time of this comparison, the data signal group associated with the address signal group being compared and the index portion of the address signal group are stored in an auxiliary storage unit 41. Also, the result of the comparison of comparator 35 is stored in auxiliary storage unit 41. When the comparison of the address signal groups is positive, then upon issuance of the next write command, the data signal group is finally stored in the data storage unit 34 at the address identified by the address signal group. The data signal group, in any event, is transferred to the main memory unit for storage as soon as possible. In the preferred embodiment, the main memory unit must always contain the latest version of the data signal groups because a plurality of the data processing subsystems use the main memory unit as the data base. However, it will be recognized by those skilled in the art that other embodiments of the present invention can have different strategies for updating the main memory unit 15.

When a read command is applied to the cache memory unit, the comparison field of the address signal group is compared in comparator unit 35 with the address signal groups in the tag storage unit 33. The index portion of the address signal group stored in the auxiliary storage unit 41 is compared with the index portion of the address signal group associated with the read operation in the auxiliary comparison unit 42. When the comparison in both the auxiliary comparison unit 42 and the comparison in the comparator unit 35 are positive, then the data signal group stored in the auxiliary storage unit 41 is the most recent version of the data signal group, and this data signal group is used by the central processing unit. As shown in FIG. 4, the "hit" signal from comparison unit 42 (which indicates that the most current version of the data signal group being addressed is in auxiliary storage unit 41) causes multiplexer 43 to allow the data signal group from the auxiliary storage unit 41 to be applied to the data-out storage unit 36. If the comparison of auxiliary comparator unit 42 is negative, i.e. no "hit" signal is applied to multiplexer 43, the data signal group from data storage unit 34 is applied to data-out storage unit 36. No matter whether the contents of data-out storage unit 36 are from data storage unit 34 or auxiliary storage unit 41, the "hit" signal from comparator unit 35 enables data-out storage unit 36 to transfer its contents to the central processing unit. As earlier described, if there is no "hit" signal from comparator unit 35, there is no data in cache memory unit 24 corresponding to the address signals stored in the address-in storage unit 32, so no data is transferred from data-out storage unit 36 to the central processing unit.

It will be clear that while the present invention divides the write operation of the cache memory unit into two suboperations (the first suboperation being performed when the write command is received and the second suboperation being performed when the next write command is received), the second suboperation can be equally well performed during the next system clock cycle when no read command is received. Such an implementation can be performed by logical apparatus that activates the storage of the data signal group from the auxiliary storage unit 41 to the data storage unit 34 during the cycle following the write cycle unless a read command is present or, if a read command is present, during the first system clock cycle in which a read command is not present.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. A cache memory unit associated with a central processing unit of a data processing unit comprising:
   first storage means for temporarily storing a preselected data signal group in response to a WRITE command;
   address storage means for temporarily storing an index of a first address signal group associated with said preselected data signal group in response to said WRITE command;
   second address storage means for storing a plurality of second address signal groups, each of said second address signal groups identified by a second address storage means location and a comparison signal group stored in said second address signal group location;
   comparison means for comparing said first address signal group and said second address signal groups, said comparison means providing a first signal when said first address signal group and a second address signal group are equivalent, said first signal being stored in said address storage means;
   second storage means for storing a plurality of second data signal groups, each of said second data signal groups associated with a one of said second address signal groups, said preselected data signal group replacing a second data signal group associated with a second address signal showing a positive comparison by said comparison means during a next WRITE command when said first signal has been stored; and
   retrieval means for retrieving a data signal group identified by a second address signal group associated with a READ command, showing a positive comparison with said first address signal group.

2. The cache memory unit associated with a central processing unit of a data processing unit of claim 1 further comprising:
   second comparison means for comparing an index portion of said address signal group portion associated with a READ command with an index portion of said first address signal group stored in said address storage means, wherein a positive comparison by said second comparison means causes said preselected data signal group to be retrieved by said retrieval means when said comparison means provides a positive signal.

3. The cache memory unit of claim 2 further including means for responding to a READ command occurring between said WRITE command and said next WRITE command.

4. The cache memory unit of claim 3 further including means for storage of said preselected data signal group can occur during a command free clock cycle when said command free cycle occurs prior to said next WRITE command.

5. The method of operation of a cache memory unit associated with a central processing unit comprising the steps of:
   identifying when a first address associated with a first data signal group of a WRITE command is present in said cache memory unit;
   temporarily storing said first data signal group during said identifying step;
   storing said data signal group in said cache memory at a location determined by said first address when said identifying step is repeated for a next WRITE command and said first address is present in said cache memory unit;
   retrieving said first data signal group in response to a READ command from temporary storage when said first address is identical to a second address associated with said READ command; and
   retrieving a data signal group from said cache memory unit when said second address is present in said cache memory unit and said second address is not identical with said first address.

6. The method of operation of a cache memory unit of claim 5 wherein said retrieving steps can take place between said identifying step and said storing step.

7. The method of operation of a cache memory unit of claim 5 wherein said storing step takes place in an absence of said retrieving step and said identifying step.

8. A cache memory unit of a central processing subsystem for storing a data signal group associated with an address signal group, said associated address signal group also being stored in said cache memory unit, comprising:
   a first storage unit storing a comparison address signal portion at a location determined by an index address signal portion of said address signal group;
   a second storage unit storing a data signal group associated with said stored address signal group at a location determined by said index address signal portion;
   comparison apparatus providing a first signal when a comparison signal portion of an input address signal group associated with a READ and a WRITE command is identical with said stored comparison address portion at a first location in said first storage unit determined by said index address signal portion;
   retrieval apparatus applying said data signal group associated with said stored address signal group to output terminals of said cache memory unit when said comparison apparatus provides said first signal in response to an input address signal group associated with said READ command;
   auxiliary storage apparatus temporarily storing a data signal group identified by said WRITE command address signal group and temporarily storing an index portion of said input address signal group associated with a WRITE command and temporarily storing said first signal associated with said WRITE command, said auxiliary storage apparatus storing said WRITE command data signal group in said second storage unit at a location determined by said index portion of said address signal group stored in said auxiliary storage apparatus upon application of a next WRITE command when said first signal is stored in said auxiliary storage apparatus; and second comparison apparatus for comparing an index input address signal portion associated with a READ command and an index address signal portion stored in said auxiliary storage apparatus in response to said READ command, said second comparison apparatus providing a second signal when said stored index address portion and said READ command address signal portion are equal, wherein said READ command causes said data signal group in said auxiliary storage apparatus to be applied to said cache memory unit output terminals when said first and said second signals and a first signal from a previous WRITE command stored in said auxiliary apparatus are provided.

* * * * *